(12) United States Patent
Gajjala et al.

(10) Patent No.: US 8,725,776 B2
(45) Date of Patent: *May 13, 2014

(54) DIGESTS TO IDENTIFY ELEMENTS IN A SIGNATURE PROCESS

(75) Inventors: Vijay K. Gajjala, Sammamish, WA (US); Giovanni M. Della-Libera, Seattle, WA (US); Vaithialingam Balayoghan, Bellevue, WA (US); Tomasz Janczuk, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 135 days.

This patent is subject to a terminal disclaimer.

(21) Appl. No.: 12/961,115

(22) Filed: Dec. 6, 2010

(65) Prior Publication Data

US 2011/0078212 A1  Mar. 31, 2011

Related U.S. Application Data

(62) Division of application No. 10/788,108, filed on Feb. 26, 2004, now Pat. No. 7,873,831.

(51) Int. Cl.
*G06F 17/30* (2006.01)

(52) U.S. Cl.
USPC .......................................... 707/803; 707/687

(58) Field of Classification Search
CPC combination set(s) only.
See application file for complete search history.

(56) References Cited

U.S. PATENT DOCUMENTS

| | | |
|---|---|---|
| 5,446,903 A | 8/1995 | Abraham et al. |
| 5,638,448 A | 6/1997 | Nguyen |
| 5,838,903 A | 11/1998 | Blakely, III et al. |
| 5,850,446 A | 12/1998 | Berger et al. |
| 5,915,024 A | 6/1999 | Kitaori et al. |
| 5,996,076 A | 11/1999 | Rowney et al. |
| 6,002,767 A | 12/1999 | Kramer |
| 6,014,666 A | 1/2000 | Helland et al. |
| 6,058,426 A | 5/2000 | Godwin et al. |
| 6,061,684 A | 5/2000 | Glasser et al. |
| 6,088,805 A | 7/2000 | Davis et al. |
| 6,141,754 A | 10/2000 | Choy |
| 6,163,772 A | 12/2000 | Kramer et al. |
| 6,233,576 B1 | 5/2001 | Lewis |
| 6,253,027 B1 | 6/2001 | Weber et al. |
| 6,279,111 B1 | 8/2001 | Jensenworth et al. |
| 6,381,602 B1 | 4/2002 | Shoroff et al. |
| 6,405,212 B1 | 6/2002 | Samu et al. |
| 6,412,070 B1 | 6/2002 | Van Dyke et al. |
| 6,434,607 B1 | 8/2002 | Haverstock et al. |

(Continued)

OTHER PUBLICATIONS

Al-Ibrahim, et al., "Authentication of Transit Flows and K-Siblings One-Time Signature", Advanced Communications and Multimedia Security, Sep. 2002, pp. 45-55.

(Continued)

*Primary Examiner* — Belinda Xue
(74) *Attorney, Agent, or Firm* — Ben Tabor; Kate Drakos; Micky Minhas (57) ABSTRACT

A signature system with a mechanism to identify element(s) of a signed document includes a sender having a signature module with a digest generator. The digest generator generates digests for identifying selected elements of the document. The resulting "identifying" digests are then used in generating a signature in which the sender signs the digests rather than the original elements. The receiver can then process the signature and use these digests to distinguish between elements, as needed.

16 Claims, 5 Drawing Sheets

(56) References Cited

U.S. PATENT DOCUMENTS

| | | | |
|---|---|---|---|
| 6,446,206 | B1 | 9/2002 | Feldbaum |
| 6,449,633 | B1 | 9/2002 | Van et al. |
| 6,473,800 | B1 | 10/2002 | Jerger et al. |
| 6,487,600 | B1 | 11/2002 | Lynch |
| 6,510,458 | B1 | 1/2003 | Berstis et al. |
| 6,513,721 | B1 | 2/2003 | Salmre et al. |
| 6,625,603 | B1 | 9/2003 | Garg et al. |
| 6,643,684 | B1 | 11/2003 | Malkin et al. |
| 6,658,573 | B1 | 12/2003 | Bischof et al. |
| 6,675,353 | B1 | 1/2004 | Friedman |
| 6,681,380 | B1 | 1/2004 | Britton et al. |
| 6,754,829 | B1 | 6/2004 | Butt et al. |
| 6,807,636 | B2 | 10/2004 | Hartman et al. |
| 6,854,056 | B1 | 2/2005 | Benantar et al. |
| 6,915,338 | B1 | 7/2005 | Hunt et al. |
| 6,931,532 | B1 | 8/2005 | Davis et al. |
| 7,010,681 | B1 | 3/2006 | Fletcher et al. |
| 7,024,662 | B2 | 4/2006 | Elvanoglu et al. |
| 7,062,566 | B2 | 6/2006 | Amara et al. |
| 7,065,706 | B1 | 6/2006 | Sankar |
| 7,535,488 | B2 | 5/2009 | Wakao et al. |
| 2002/0040431 | A1 | 4/2002 | Kato et al. |
| 2002/0044662 | A1* | 4/2002 | Sowler ............... 380/277 |
| 2003/0135753 | A1 | 7/2003 | Batra et al. |
| 2003/0177388 | A1 | 9/2003 | Botz et al. |
| 2003/0196096 | A1* | 10/2003 | Sutton ............... 713/181 |
| 2003/0217044 | A1 | 11/2003 | Zhang et al. |
| 2004/0123109 | A1* | 6/2004 | Choi ............... 713/176 |
| 2004/0148508 | A1 | 7/2004 | Alev et al. |
| 2004/0181756 | A1 | 9/2004 | Berringer et al. |
| 2005/0063545 | A1* | 3/2005 | Fujimoto et al. ............... 380/277 |
| 2005/0138378 | A1 | 6/2005 | Pourzandi et al. |
| 2005/0149729 | A1* | 7/2005 | Zimmer et al. ............... 713/168 |

OTHER PUBLICATIONS

"Apache HTTP Server Version 2.0: Authentication, Authorization and Access Control", retrieved on Mar. 5, 2004 at <<http://httpd.apache.org.docs-2.0/howto/auth.html>>, Jan. 2004, pp. 1-5 and 1-4.

Bai, et al., "New String Matching Technology for Network Security", IEEE, Mar. 2003, pp. 198-201.

Bartel, et al., "XML-Signature Syntax and Processing", retrieved on Feb. 26, 2004 at <<http://www.w3.org/TR/2002/REC-xmldsig-core-20020212/>>, W3C Recommendation Feb. 12, 2002, W3C, 2002, pp. 1-64.

Beaver, "Network Security and Storage Security: Symmetries and Symmetry-Breaking", IEEE, Dec. 2003, pp. 3-9.

Bertino, et al., "On Specifying Security Policies for Web Documents with an XML-Based Language", Proceedings of 6th ACM Symposium on Access Control Models and Technologies, May 2001, pp. 57-65.

Bishop, "What Is Computer Security?", IEEE Computer Society, Jan. 2003, pp. 67-69.

Boyer, et al., "XML-Signature XPath Filter 2.0", retrieved on Feb. 26, 2004 at <<http://www.w3.org/TR/2002/REC-xmldsig-filter2-20021108>>, W3C Recommendation Nov. 8, 2002, W3C, 2002, pp. 1-13.

Cavale, "Dynamic Groups in Windows Server 2003 Authorization Manager", Jan. 2003, pp. 1-6.

Chatvichienchai, et al., "Translating Content-Based Authorizations for XML Documents", Proceedings of 4th Intl Conf on Web Info Systems and Engineering, IEEE, Dec. 2003, 10 pgs.

Clark, et al., XML Path Language (XPath), Version 1.0, W3C Recommendations, In http://www.w3.org/TR/xpath.html, Nov. 1999, 37 pgs.

Desmedt, et al., "Perfectly Secure Message Transmission Revisted (Extended Abstract)", Eurocrypt 2002, LNCS 2332, 2002, pp. 502-517.

Essmayr, et al., "Identity Mapping—An Approach to Unravel Enterprise Security Management Policies", Software Competence Center Hagenberg, Aug. 2000, pp. 78-88.

Fielding, "Relative uniform Resource Locators", Internet RFC 1808, Jun. 1995, 23 pgs.

Fremberg, "The Mithra Authentication Protocol", Dr. Dobb's Journal, http://www.ddj.com, May 2003, pp. 44-48.

Gailey, "Encrypting SOAP Messages Using Web Services Enhancements", Web Services Enhancements (WSE): Encrypting SOAP Messages Using Web Service Enhancements, Mar. 2003, pp. 1-14.

Geer, "Taking Steps to Secure Web Services", Technology News, IEEE Computer Society, Oct. 2003, pp. 14-16.

Hsieh, et al., "On the Security of Some Password Authentication Protocols", Informatica, vol. 14, No. 2, Apr. 2003, pp. 195-204.

Hwang, et al., "An Enhanced Authentication Key Exchange Protocol", Proceedings of the 17th International Conference on Advanced Information Networking and Applications (AINA 2003), IEEE, Mar. 2003, pp. 704-711.

Lin, et al., "A Multi-Hierarchy Model for Role-Based Control", Journal of Huazhong University of Science and Technology (Nature Science Edition), vol. 30, No. 2, Feb. 2002, pp. 102-104.

Looi, "Enhanced Authentication Services for Internet Systems using Mobile Networks", Global Telecommunications Conference, IEEE, Nov. 2001, pp. 3468-3472.

Morogan, et al., "Certificate Management in Ad Hoc Networks", Department of Computer Science, Royal Institute of Technology, Jan. 2003, pp. 337-341.

Osborn, "Database Security Integration Using Role-Based Access Control", Department of Computer Science, The University of Western Ontario, Chapter 22, Aug. 2000, pp. 245-257.

Park, et al., "An Efficient Stream Authentication Scheme", IEICE Trans. Inf. & Syst., vol. E86-D, No. 4, Apr. 2003, pp. 704-711.

Rogoski, "Safe and Secure", Health Management Technology, www.healthmgttech.com, Dec. 2002, 4 pages.

Skonnard, "Understanding SOAP", Web Service Basics: Understanding SOAP (SOAP Technical Articles), Mar. 2003, pp. 1-12.

Srivastava, "Secure It—WS-Security and Remoting Channel Sinks Give Message-level Security to Your SOAP Packets", MSDN Magazine, vol. 18, No. 11, Nov. 2003, pp. 91-98.

Sun, "A Stateful Multicast Access Control Mechanism for Future Metro-Area-Networks", Electronic Networking Applications and Policy, Third International Network Conference 2002, vol. 13, No. 2, Jul. 2002, pp. 134-138.

Vuong, et al., "Managing Security Policies in a Distributed Environment Using eXtensible Markup Language (XML)", Proceedings of 2001 ACM symposium on Applied Computing, Mar. 2001, pp. 405-411.

Wakayama, et al., "A Remote User Authentication Method Using Fingerprint Matching", Nagoya Institute of Technology, vol. 44, No. 2, Feb. 2003, pp. 401-404.

"X.509 Certificates and Certificate Revocation Lists (CRLs)", Sun Microsystems, Inc., May 2001, pp. 1-5.

* cited by examiner

DIGESTS TO IDENTIFY ELEMENTS IN A SIGNATURE PROCESS

CROSS REFERENCE TO RELATED PATENT APPLICATIONS

This application claims priority to and is a continuation of co-pending, commonly owned U.S. patent application Ser. No. 10/788,108, entitled "Digests to Identify Elements in a Signature Process", filed on Feb. 26, 2004, which application is incorporated herein by reference.

TECHNICAL FIELD

Various embodiments described below relate generally to security mechanisms for computing environments, and more particularly but not exclusively to signature processes with mechanisms to identify elements of messages.

BACKGROUND

Many message-based computing systems (e.g. using eXtensible Markup Language or XML documents) include a digital signature process to secure messages (e.g., integrity, message authentication, signer authentication, etc.) sent from a sender to a recipient or receiver. In some systems, messages with signature(s) can be sent to the receiver via one or more intervening nodes. Typically, such signature schemes are used to detect changes to signed information included in the message(s). If such changes are detected in a received message, the receiver can then reject the message.

In some applications, there is a need to identify which particular element of a message is signed. One mechanism for performing this identification is to provide an identifier (ID) for each element. Another mechanism, applicable to XML documents, is to identify a subset of the XML document. For example, such a mechanism can use Qualified Names (QNames) as defined in Xpath (e.g., XML Path Language Version 1.0, Nov. 16, 1999).

However, these conventional solutions have shortcomings in some message-based systems. For example, for conventional ID-based solutions, a message may initially have a header that does not have an ID. Then a subsequent node can add an ID to the header. If the header was part of the original message's signed information, adding the ID can invalidate the signature and can also invalidate the schema of that element, which may not allow IDs as attributes. Also, adding the ID can invalidate the schema of that element (e.g. the schema may not allow IDs as attributes).

One shortcoming for conventional QName-based solutions can occur in some messaging systems that allow reordering of document parts. For example, in Simple Object Access Protocol (SOAP) (e.g., SOAP version 1.2, W3C Recommendation 24 June 2003), the order of the headers in the message can be changed and, further, multiple headers can have the same QName. However, changing the order of the headers can result in errors. For example, if a simple QName-based XPath is used to identify more than one headers with that QName, the order of these headers in the original message vs. the order of these headers in the mutated message will affect the digest value of the signed reference, thereby violating the signature itself. In another example, if a QName XPath with a positional predicate is used (i.e. "the second header with such and such QName"), reordering of the headers can affect the signature. Also, adding headers with the same QName can invalidate the signature. Consequently, neither ID-based solutions nor XPath-based solutions can provide a mechanism for ensuring accurate selection of a header without signature and/or schema violations.

SUMMARY

In accordance with aspects of the various described embodiments, a signature system with a mechanism to identify element(s) of a signed document is provided. The system includes a sender having a signature module with a digest generator. The digest generator generates digest(s) for identifying selected element(s) of the document. The resulting "identifying" digests are then used in generating a signature in which the sender signs the digest(s). The receiver can then process the signature and use these digests to distinguish between elements, as needed. This aspect enables a signature system to distinguish between elements for both ID-based systems and QName-based systems (i.e., since reordering the elements does not change their digests), thereby providing a more robust and generic solution.

In another aspect, for implementations in which the document is compatible with XML DSIG (e.g., XML—Signature Syntax and Processing, W3C Recommendation 12 Feb. 2002), the generation of the "DigestValue" element (defined in XML DSIG) is effectively eliminated. In one implementation of this aspect, "DigestValue" generation is avoided for the most part by assigning the value of the "DigestValue" element to be a digest of a zero-length octet stream or other preselected constant value. Thus, the digest of this value is a known constant, thereby essentially eliminating the time/processing effort in generating the "DigestValue" element. This aspect still preserves integrity/authentication of the selected elements because the standard XML DSIG "SignatureValue" element will be computed over the "SignedInfo" element, which contains the digests identifying the signed elements.

In yet another aspect, the messaging system is based on SOAP, with the aforementioned "Transforms" element including a SOAP transform. The SOAP transform element includes "identifying" digest(s) of the message headers.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
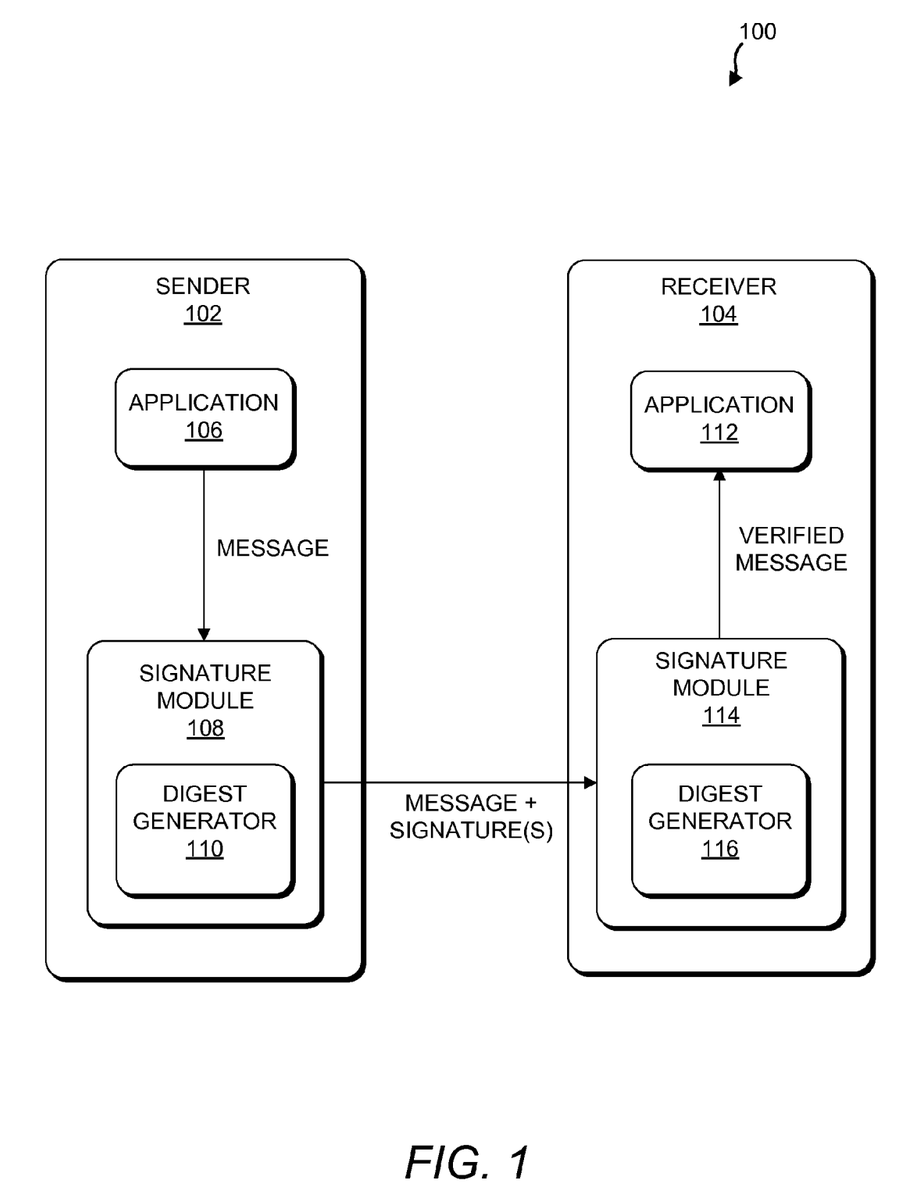
FIG. 1 is a block diagram illustrating a system with a mechanism to identify element(s) of a signed message, according to one embodiment.

FIG. 1 is a block diagram illustrating a message-based system 100 with a mechanism to identify element(s) of a signed message, according to one embodiment. In this example, system 100 includes a sender 102 and a receiver 104. Sender 102 and receiver 104, for example, can be different processes executing on a single computing platform, within the same process, or different nodes of a network. Sender 102 includes an application 106 and a signature module 108. Receiver 104 includes an application 112 and a signature module 114. In accordance with this embodiment, signature modules 108 and 114 respectively include digest generators 110 and 116. Digest generators 110 and 116 are used to provide identifying digest(s) for selected message element(s). The operation of signature modules 108 and 114 are described below in conjunction with FIGS. 2 and 3, respectively.

Figure 2:
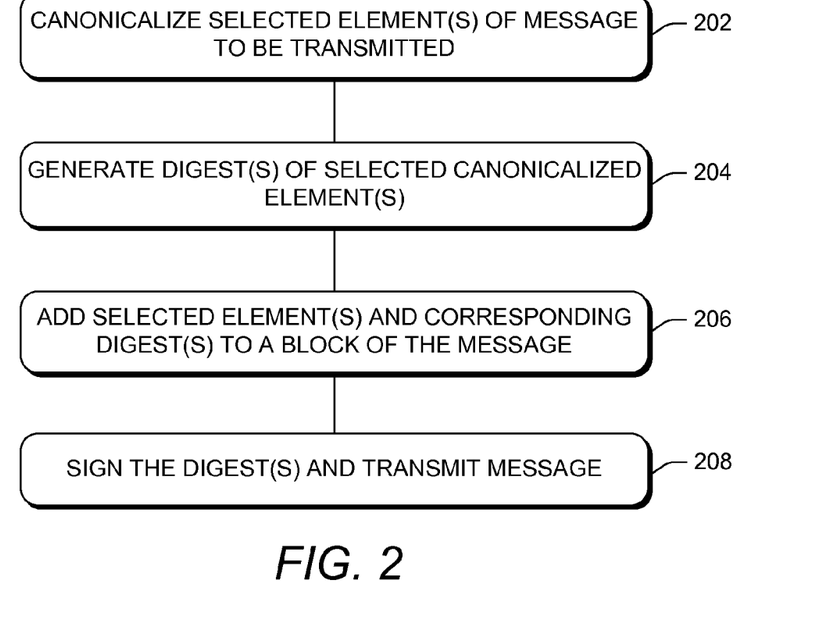
FIG. 2 is a flow diagram illustrating operational flow of the sender depicted in the system of FIG. 1 in signing a document, according to one embodiment.

FIG. 2 illustrates an operational flow of sender 102 (FIG. 1) of system 100 (FIG. 1). More particularly, FIG. 2 is a flow diagram illustrating operational flow of signature module 108 (FIG. 1) of sender 102 in signing a message, according to one embodiment. Referring to FIGS. 1 and 2, selected element(s) (e.g., headers) of a message to be transmitted are canonicalized, as shown in a block 202. In one embodiment, signature module 108 canonicalizes the selected element(s). Any suitable canonicalization algorithm can be used such as, for example, "Canonical XML Without Comments", which is suitable for XML-based messages. In other embodiments, different canonicalization algorithms can be used.

In a block 204, the canonicalized element(s) are digested. In one embodiment, digest generator 110 operates on the element(s), outputting digest(s) corresponding to each canonicalized element. Digest generator 110 can use any suitable digest algorithm such as, for example, SHA1. In other embodiments, different digest algorithms can be used. The resulting digest(s) are heuristically unique for each element(s) and, therefore, can be used to distinguish elements.

In a block 206, the element(s) and corresponding digest(s) are included in a selected block of the message, in this embodiment. In an XML-based embodiment, the element(s) and digest(s) are included in a "Transform" block of the message. In other embodiments, the element(s) and corresponding digest(s) can be placed in a differently named "block" of a message or document.

In a block 208, the digest(s) are signed and the message is transmitted. In one embodiment, signature module 108 signs the digest(s). Any suitable signing algorithm can be used. For example, for an XML-based message, signature module 108 can use the "DSAwithSHA1 (DSS)" algorithm, or the RSAwithSHA1 algorithm. In other embodiments, different signature algorithms can be used. As shown in FIG. 1, the message and signature(s) are then sent to receiver 104. In some embodiments, elements within the message can be reordered, or other element(s) can be added. The processing of the message and signature(s) by receiver 104 is described below in conjunction with FIG. 3.

Although the above operational flow is described sequentially in conjunction with FIG. 2, in other embodiments, operations described in the blocks may be performed in different orders, and/or in parallel.

Figure 3:
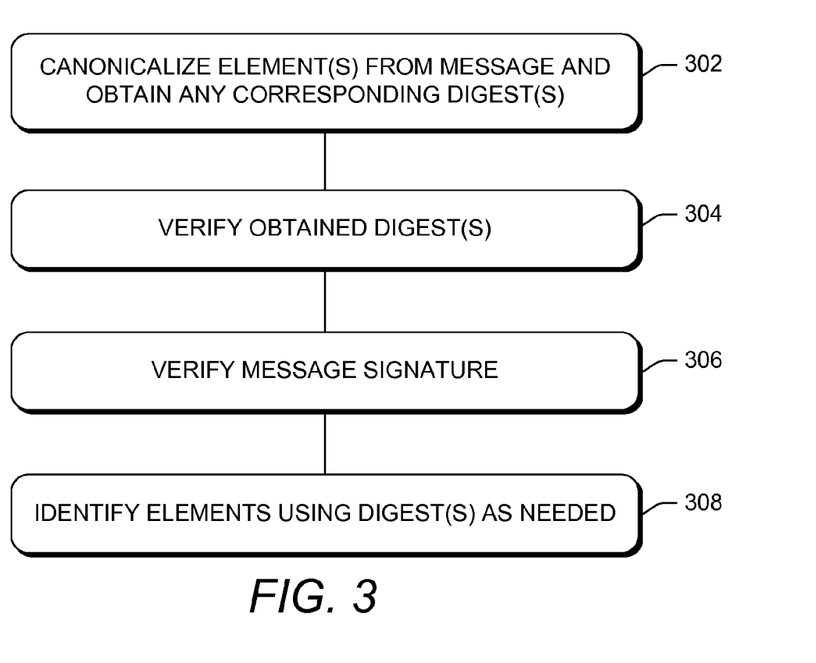
FIG. 3 is a flow diagram illustrating operational flow of the receiver depicted in the system of FIG. 1 in verifying a signature and identifying element(s), according to one embodiment.

FIG. 3 illustrates an operational flow of receiver 104 (FIG. 1). In particular, FIG. 3 is a flow diagram illustrating operational flow of signature module 114 (FIG. 1) of receiver 104 in verifying a signature and identifying element(s), according to one embodiment. Referring to FIGS. 1 and 3, in one embodiment, selected element(s) (e.g., headers) of the received message are canonicalized, as shown in a block 302. In one embodiment, signature module 114 canonicalizes the selected element(s), using the same canonicalization algorithm as used by signature module 108. While canonicalizing the selected element(s), signature module 114 also obtains the digest(s) corresponding to the element(s).

In a block 304, the obtained digest(s) are verified. In one embodiment, digest generator 116 verifies the digest(s) by digesting the received element(s) using the same digest algorithm as digest generator 110 of sender 102. Signature module 114 can then compare these digest(s) from digest generator 116 with the digest(s) obtained from the received message in block 302. In one embodiment, signature module 114 checks whether an element with such a digest value has been signed. In a general case, there is a set of digests values, one of which possibly matches exactly the digest computed by signature module 114. Signature verification is successful if for every individual digest value from the signature, signature module 114 can find a unique element in the message matching that digest value. If the digests match, then signature module 114 can further process the received message.

In a block 306, the message signature is verified. In one embodiment, signature module 114 verifies the message signature. In this embodiment, signature module 114 verifies the signature using the same signature algorithm as signature module 108 of sender 102. If the signature is verified, then receiver 104 can further process the received message. For example, signature module 114 can pass the verified message to application 112 (as shown in FIG. 1) for further processing.

In a block 308, each of the selected element(s) can be identified using the digest corresponding to that element, as needed. For example, application 112 can then select a particular element of the message using the digest for that element. In one embodiment, block 308 is performed together with block 304.

Although a message is processed in the above exemplary embodiments, more generally, in other embodiments, a document (e.g., any XML document or other markup language document) can be signed using digests.

Although the above operational flow is described sequentially in conjunction with FIG. 3, in other embodiments, operations described in the blocks may be performed in different orders, and/or in parallel.

Figure 4:
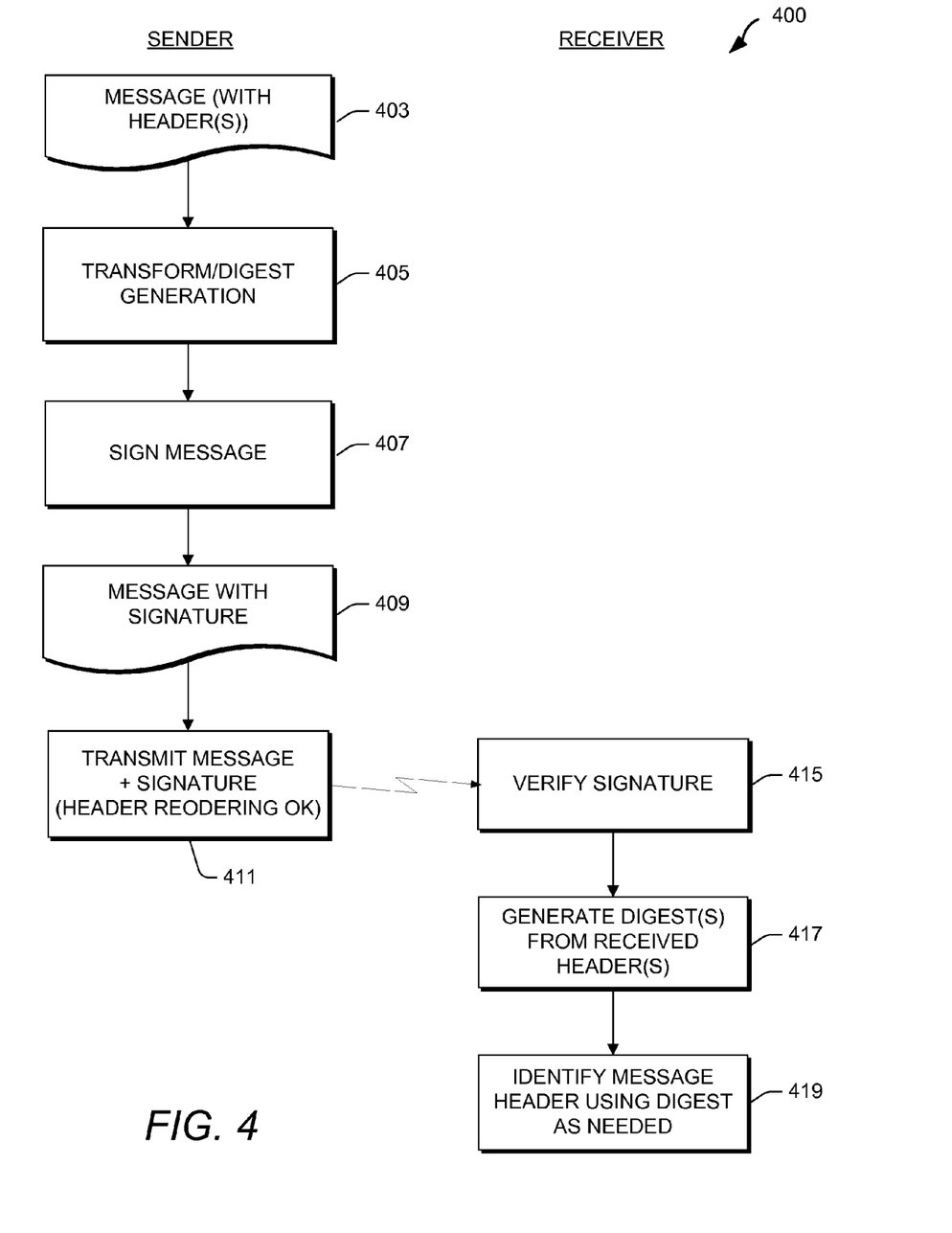
FIG. 4 is a flow diagram illustrating data flow in generating digests in a SOAP-based messaging system, according to one embodiment.

FIG. 4 is a flow diagram illustrating data flow 400 in system 100 (FIG. 1), according to one embodiment. In this exemplary embodiment, system 100 uses a SOAP-based messaging system. Referring to FIGS. 1 and 4, data flows through and is processed by signature modules 108 and 114 of system 100 as follows. Signature module 108 receives a SOAP message 403 (e.g., from application 106) that, in this example, includes one or more headers. In this embodiment, signature module 108 performs a SOAP transform process 405 on SOAP message 403 in which SOAP transform process 405 includes generating digest(s) for headers in the SOAP message. In particular, digest generator 110 of signature module 108 generates the digest(s). In this embodiment, SOAP transform process 405 uses the aforementioned SHA1 digest algorithm after the signed info message has been canonicalized (see block 204 in FIG. 2). The digests are then added to a SOAP transform block of the SOAP message.

In this embodiment signature module 108 then performs a signature process 407 on SOAP message 403 (which now includes one or more digests). In one embodiment, signature process 407 uses the aforementioned "DSAwithSHA1 (DSS)" algorithm. This signature process produces a SOAP message (with signature) 409.

Sender 102, in this embodiment, then performs a transmit process 411 by which sender 102 sends SOAP message (with signature) 409 to receiver 104. In transmit process 411, the order of the header(s) can be changed, or one or more headers can be added, etc., according to the SOAP standard.

In this embodiment, receiver 104 then receives message (with signature) 409 and performs a signature verification process 415. For example, signature module 114 may perform signature verification process 415 as described above in conjunction with block 306 (FIG. 3). If the signature verification process fails, the dataflow 400 essentially aborts.

However, if signature verification process 415 passes, signature module 114 (more particularly, digest generator 116 of signature module 114) then performs a digest generation process 417 on selected header(s). Digest generation process 417 uses the same digest algorithm in SOAP transform process 405. That is, digest generators 110 and 116 perform the same digest algorithm. If the digest generated in process 417 for a header does not match the digest generated for that header in SOAP transform process 405, then the dataflow for that header essentially aborts. However, if the digests match, then receiver 104 can further process the header. For example, in this embodiment, application 112 of receiver 104 can then perform a header identification process 419 to identify header(s) using the digest(s), as needed. Although the above processes as described sequentially, in some embodiments certain processes can be performed in different orders. For example, verification process 415 can be performed after processes 417 and 419 in some embodiments.

Figure 5:
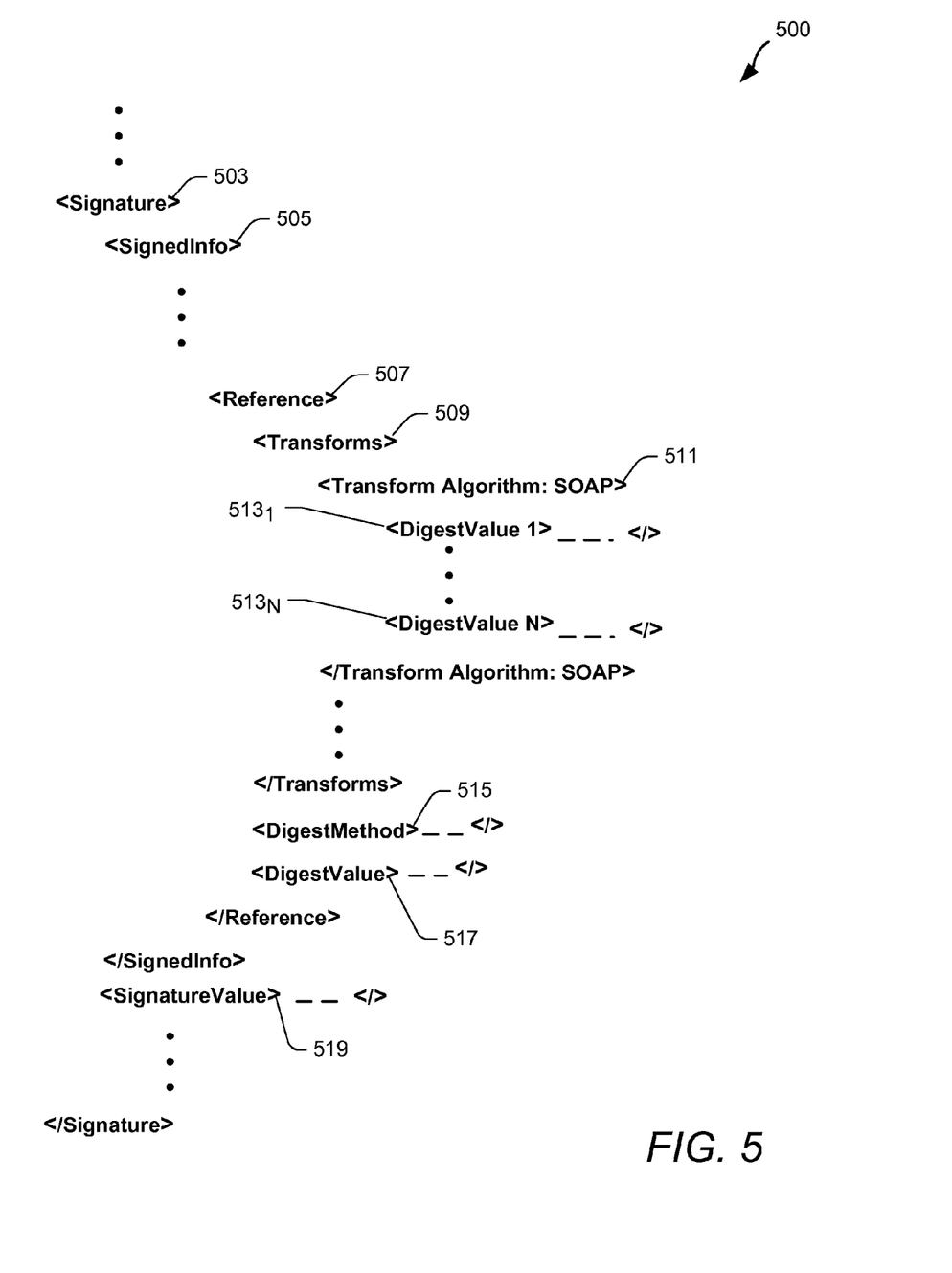
FIG. 5 is a diagram illustrating a portion of a signature of a document for use in a SOAP-based messaging system, according to one embodiment.

FIG. 5 is a diagram illustrating a portion 500 of a signed markup language message, such as may be used in a SOAP-based messaging system, according to one embodiment. More particularly, portion 500 is illustrative of XML DSig format. In other embodiments, other signature formats can be used. In this example embodiment, portion 500 is part of a SOAP message and includes:

a Signature element 503;

a SignedInfo element 505 contained in Signature element 503;

a Reference element 507 contained in SignedInfo element 505;

a Transforms element 509 contained in Reference element 507;

a Transform Algorithm element 511 contained in Transforms element 509;

a set of DigestValue elements 513.sub.1-513.sub.N contained in Transform Algorithm element 511;

a DigestMethod element 515 contained in Reference element 507;

a DigestValue element 517 contained in Reference element 507; and a SignatureValue element 519 contained in Signature element 503.

The elements described above, in this embodiment, conform to the aforementioned XML-Signature Syntax and Processing specification. Signature element 503 includes other elements (e.g., CanonicalizationMethod, SignatureMethod, KeyInfo), which are not shown in FIG. 5 to promote clarity. Although many of the above elements are defined in the XML-Signature Syntax and Processing specification, brief descriptions of some of these elements are provided below for convenience.

SignedInfo element 505 identifies the information that is signed and includes information specifying a signature algorithm that processes the SignedInfo into SignatureValue element 519. Reference element 507 includes information specifying a digest algorithm and digest value (i.e., elements 515 and 517), and may also include a Transforms element 509 that specifies processes (e.g., SOAP transform of Transform Algorithm element 511) that were applied to a data object associated with the signature. In this example embodiment, Transform Algorithm element 511 is a SOAP transform that includes generating DigestValue elements 513.sub.1-513.sub.N from header elements (not shown) of the message for which signature code 500 is a part. DigestValue element 517 is the result of applying the algorithm of DigestMethod element 515 to the data object or, if present (as in this example), the output of the Transform Algorithm(s) specified in Transforms element 509. An example is shown in Appendix 1.

In one optimization, SOAP transform of Transform Algorithm element 511 is configured not only to generate DigestValues 513.sub.1-513.sub.N, but also to generate a "transformation output" of a known constant (e.g., a zero-length octet stream). Consequently, DigestValue element 517 will be the same for all SOAP messages processed by SOAP transform of Transform Algorithm element 511. Thus, once calculated, the value of DigestValue element 517 can simply be filled in rather than recalculated for each message, thereby reducing the processing load. This alternative embodiment still preserves integrity/authentication of Transforms element 509 because SignatureValue element 519 is computed over DigestValue elements 513.sub.1-513.sub.N. Thus, any change to the headers or DigestValue elements 513.sub.1-513.sub.N during transmission from the sender to the receiver will be detected when SignatureValue element 519 is verified by the receiver.

The various embodiments described above may be implemented in computer environments of the senders and receivers. An example computer environment suitable for use in the senders and receivers is described below in conjunction with FIG. 6.

Figure 6:
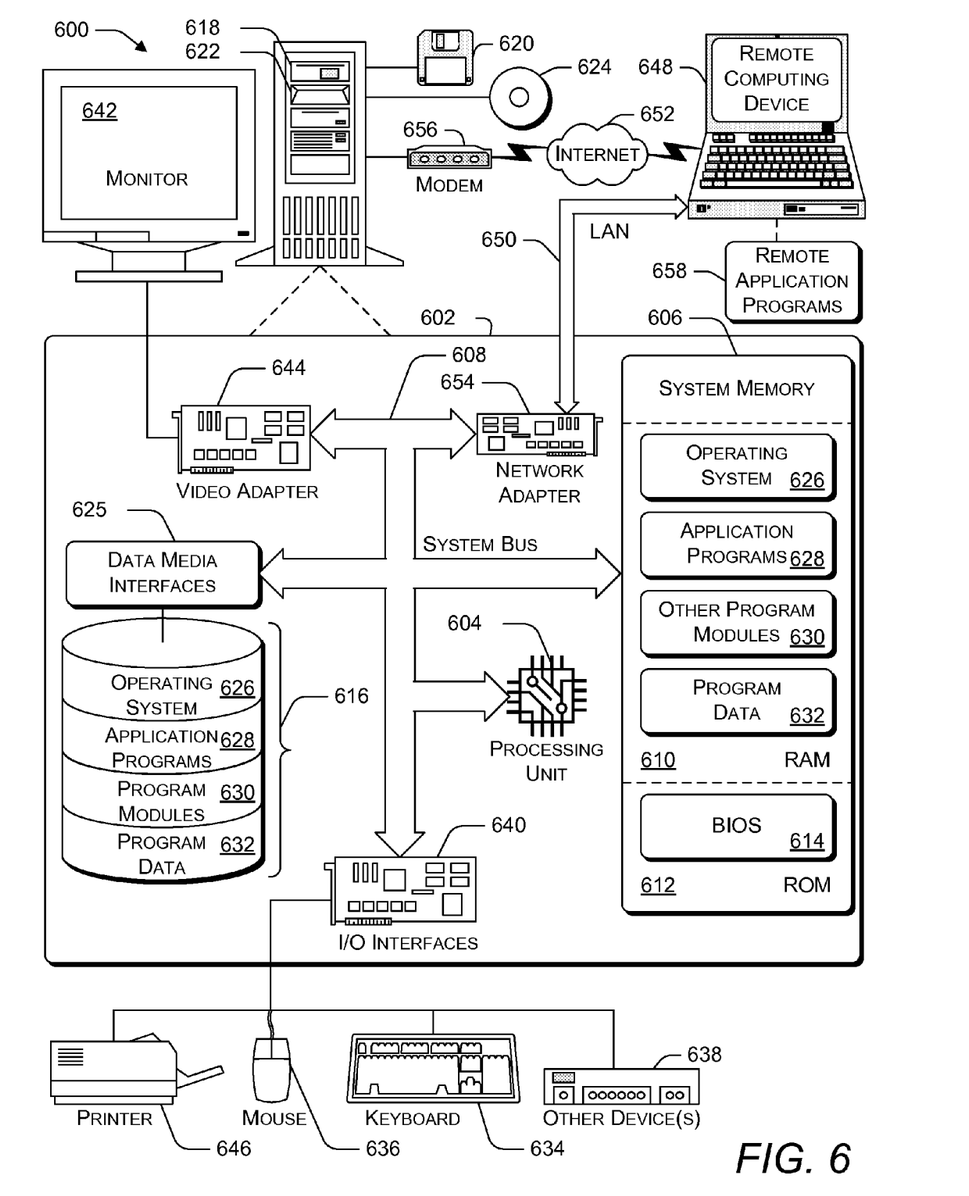
FIG. 6 is a block diagram illustrating an example computing environment suitable for practicing the above embodiments.

FIG. 6 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. The components of computer 602 can include, but are not limited to, one or more processors or processing units 604, system memory 606, and system bus 608 that couples various system components including processor 604 to system memory 606.

System bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 602 may include a variety of computer readable media. Such media can be any available media that is accessible by computer 602 and includes both volatile and non-volatile media, removable and non-removable media.

System memory 606 includes computer readable media in the form of volatile memory, such as random access memory (RAM) 610; and/or non-volatile memory, such as read only memory (ROM) 612 or flash RAM. Basic input/output system (BIOS) 614, containing the basic routines that help to transfer information between elements within computer 602, such as during start-up, is stored in ROM 612 or flash RAM. RAM 610 typically contains data and/or program modules that are immediately accessible to and/or presently operated on by processing unit 604.

Computer 602 may also include other removable/non-removable, volatile/non-volatile computer storage media. By way of example, FIG. 6 illustrates hard disk drive 616 for reading from and writing to a non-removable, non-volatile magnetic media (not shown), magnetic disk drive 618 for reading from and writing to removable, non-volatile magnetic disk 620 (e.g., a "floppy disk"), and optical disk drive 622 for reading from and/or writing to a removable, non-volatile optical disk 624 such as a CD-ROM, DVD-ROM, or other optical media. Hard disk drive 616, magnetic disk drive 618, and optical disk drive 622 are each connected to system bus 608 by one or more data media interfaces 625. Alternatively, hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, removable magnetic disk 620, and removable optical disk 624, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 616, magnetic disk 620, optical disk 624, ROM 612, and/or RAM 610, including by way of example, operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as keyboard 634 and a pointing device 636 (e.g., a "mouse"). Other input devices 638 (not shown specifically) may include a microphone, joystick, game pad, satellite dish, serial port, scanner, and/or the like. These and other input devices are connected to processing unit 604 via input/output interfaces 640 that are coupled to system bus 608, but may be connected by other interface and bus structures, such as a parallel port, game port, or a universal serial bus (USB).

Monitor 642 or other type of display device can also be connected to the system bus 608 via an interface, such as video adapter 644. In addition to monitor 642, other output peripheral devices can include components such as speakers (not shown) and printer 646, which can be connected to computer 602 via I/O interfaces 640.

Computer 602 can operate in a networked environment using logical connections to one or more remote computers, such as remote computing device 648. By way of example, remote computing device 648 can be a PC, portable computer, a server, a router, a network computer, a peer device or other common network node, and the like. Remote computing device 648 is illustrated as a portable computer that can include many or all of the elements and features described herein relative to computer 602. Alternatively, computer 602 can operate in a non-networked environment as well.

Logical connections between computer 602 and remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, computer 602 is connected to local network 650 via network interface or adapter 654. When implemented in a WAN networking environment, computer 602 typically includes modem 656 or other means for establishing communications over wide network 652. Modem 656, which can be internal or external to computer 602, can be connected to system bus 608 via I/O interfaces 640 or other appropriate mechanisms. It is to be appreciated that the illustrated network connections are examples and that other means of establishing at least one communication link between computers 602 and 648 can be employed.

In a networked environment, such as that illustrated with computing environment 600, program modules depicted relative to computer 602, or portions thereof, may be stored in a remote memory storage device. By way of example, remote application programs 658 reside on a memory device of remote computer 648. For purposes of illustration, applications or programs and other executable program components such as the operating system are illustrated herein as discrete blocks, although it is recognized that such programs and components reside at various times in different storage components of computing device 602, and are executed by at least one data processor of the computer.

Various modules and techniques may be described herein in the general context of computer-executable instructions stored on one or more computer-readable media and executable by one or more processors. For instance, the computer-executable instructions when executed by one or more processors, may cause the one or more processors to perform operations such as the operations recited in FIGS. 2-4. Generally, computer-executable instructions include routines, programs, objects, components, data structures, and the like that cause the particular functions to be performed or particular abstract data types to be implemented.

Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" may embody computer readable instructions, data structures, program modules, or other data in a modulated data signal, such as a carrier wave, or other transmission mechanism. As defined herein, computer storage media does not include communication media.

Reference has been made throughout this specification to "one embodiment," "an embodiment," or "an example embodiment" meaning that a particular described feature, structure, or characteristic is included in at least one embodiment of the present disclosure. Thus, usage of such phrases may refer to more than just one embodiment. Furthermore, the described features, structures, or characteristics may be combined in any suitable manner in one or more embodiments.

One skilled in the relevant art may recognize, however, that the present disclosure may be practiced without one or more of the specific details, or with other methods, resources, materials, etc. In other instances, well known structures, resources, or operations have not been shown or described in detail merely to avoid obscuring aspects of the present disclosure.

While example embodiments and applications have been illustrated and described, it is to be understood that the present disclosure is not limited to the precise configuration and resources described above. Various modifications, changes, and variations apparent to those skilled in the art may be made in the arrangement, operation, and details of the methods and systems of the present disclosure disclosed herein without departing from the scope of the claimed present disclosure.

What is claimed is:

1. At least one computer-readable storage medium storing a plurality of instructions that are executable by one or more processors to cause the one or more processors to:
    perform a Simple Object Access Protocol (SOAP) transform process a plurality of SOAP messages using a data structure, the data structure of individual ones of the SOAP messages comprising:
    a first field to contain a signature element, the first field to include:
    a second field to contain a transform element that specifies a transfer algorithm applied to a header element of the SOAP message to generate a digest value,
    a third field within the second field to contain the digest value,
    a fourth field to contain a digest algorithm applied to the digest value to generate a digest value element,
    a fifth field to contain the digest value element, the digest value element being the same for each of the SOAP messages;
    wherein the second field to contain the transform element specifies the transfer algorithm to generate a zero-length octet stream; and
    transmitting at least one of the SOAP messages to a receiver.

2. The at least one computer-readable storage medium of claim 1, wherein the second field to contain the transform element specifies a SOAP transform transfer algorithm.

3. The at least one computer-readable storage medium of claim 1, wherein the first field to further include a canonicalization algorithm applied to the header element.

4. The at least one computer-readable storage medium of claim 1, wherein the first field to further include a signature algorithm applied to the header element.

5. The at least one computer-readable storage medium of claim 1, wherein the digest value element is the same for all SOAP messages processed by the transfer algorithm.

6. The at least one computer-readable storage medium of claim 1, wherein the data structure is formed using an extensible markup language (XML).

7. The at least one computer-readable storage medium of claim 1, wherein the data structure comprises markup tags to define the first, second, third, fourth, and fifth field.

8. One or more computer-readable storage media storing a signature module executable by one or more processors to:
    receive a message to be transmitted, the message including a set of header entries to modify a content of the message;
    select one or more of the header entries from the set of header entries;
    canonicalize the selected header entries based on the same canonicalization algorithm used to sign the message to generate one or more canonicalized header elements;
    generate resulting digests for each of the one or more canonicalized header elements selected from among the set of header entries, each canonicalized header element resulting in a unique resulting digest;
    sign the resulting digests using an algorithm having a zero-length octet stream output and wherein the signature is an extensible markup language (XML) signature; and
    transmit the message to a receiver.

9. The one or more computer-readable storage media of claim 8, wherein the signature module when executed by the one or more processors further causes, the one or more processors to:
    add the set of header entries and the resulting digests to the message and sign the resulting digests.

10. The one or more computer-readable storage media of claim 8, wherein the signature module when executed by the one or more processors further causes, the one or more processors to:
    add the set of header entries and the resulting digests to the message;
    sign the resulting digests; and
    reorder one or more of the selected header entries after signing the resulting digests.

11. The one or more computer-readable storage media of claim 8, wherein the message includes an extensible markup language (XML) signature and further wherein the signature module is further to add the resulting digests to a transform element of the XML signature.

12. The one or more computer-readable storage media of claim 8, wherein the signature module when executed by the one or more processors further causes, the one or more processors to sign the resulting digests using an algorithm having a preselected constant output.

13. The one or more computer-readable storage media of claim 8, wherein the signature module when executed by the one or more processors further causes, the one or more processors to sign the resulting digests using at least two unique signing algorithms.

14. One or more computer readable storage medium storing computer-executable instructions that, when executed, cause one or more processors to perform acts comprising:
    receiving a message to be transmitted, the message including a set of header entries;
    selecting one or more of the header entries from the set of header entries;
    canonicalizing the selected header entries to generate one or more canonicalized header elements;
    generating resulting digests for each of the one or more canonicalized header elements selected from among the set of header entries, each canonicalized header element resulting in a unique resulting digest and each unique resulting digest having a value that matches a unique element in the message;
    computing an extensible markup language (XML) signature value element over the resulting digests for each of the one or more canonicalized header elements using at least two unique signing algorithms, at least one of the two unique signing algorithms having a zero-length octet stream output; and
    transmitting the message to a receiver.

15. The computer readable storage medium of claim 14, the acts further comprising adding the set of header entries and the resulting digests to the message and signing the resulting digests.

16. The computer readable storage medium of claim 14, further comprising storing additional computer-executable instructions that, when executed, cause one or more processors to perform acts comprising:
   signing the resulting digests using an algorithm having a preselected constant output.

* * * * *